United States Patent Office 2,854,214
Patented Sept. 30, 1958

2,854,214

WELL DRILLING

Moral R. McArthur and Francis B. Odasz, Jr., Cody, Wyo., assignors to Husky Oil Company, Cody, Wyo., a corporation of Delaware No Drawing. Application June 14, 1955
Serial No. 515,550

3 Claims. (Cl. 255—1.8)

This invention relates to improvements in the drilling of wells and more particularly, wells drilled for oil or gas. It is especially useful in operations where the rotary method of drilling is employed.

In the drilling of such wells, it is customary to circulate a drilling fluid, or mud, down through the drilling stem to the point of drilling, out through the bit and from thence upwardly through the annular space between the drilling stem and the walls of the well.

These drilling fluids serve several important functions, for instance, they carry the cuttings out of the well, they plaster up the walls of the hole to prevent them from falling in and to retard the loss of the drilling fluid to the rock formations, they serve to cool the bit and act as a lubricant for the bearings in the bit, and also serve to pressure the well against the entry into the hole of fluids and gases present in the rock formations and against blow-outs, all as well understood in the art.

Not infrequently in well drilling, a formation is encountered which is unusually porous or contains fissures or cavities and which must be sealed off to prevent escape of the drilling fluid from the well into the formation or to prevent the flow of gas or water from the formation into the well. Such condition is extremely serious, not only because of loss of the relatively expensive drilling fluid but also because drilling cannot proceed until circulation has been reestablished.

The sealing of the walls of the well in such instances has heretofore been accomplished by the use of Portland cement or other similar materials. Usually the drilling tools are removed from the well and a slurry of cement is pumped down the drill stem into the well and back into the cavities of the formation so as to form in the hole a solid core or plug at the depth where the fault is encountered. The cement is permitted to set for the required time to harden, frequently several days, and then the center of the plug is drilled out elaving on the walls of the well a more or less impervious lining of the cement.

This procedure has been time consuming and costly, not only due to the cost of labor and materials but also because of the loss of costly effective drilling time, including that while permitting the cement to harden, and the necessity of redrilling the hard core of cement.

A further objection to the use of cement in sealing the walls of such wells is that the potential oil and gas production from the formation so treated is permanently sealed off from the well.

The present invention provides an improved method of sealing the walls of wells whereby lost drilling time is materially reduced and the overall expense of well sealing is minimized.

These and other advantages are obtained in accordance with the present invention by using, in place of the customary cement, a thermoplastic bituminous material, for instance an asphalt, of the type and having the particular characteristics hereinafter described.

Previous attempts to use asphalt as a wall sealing medium have resulted in the formation of an asphalt plug in the well through which it has been extremely difficult to drill. Where attempts have been made to drill through such plugs with conventional rotary tools, the drilling has been slow, of the order of only 5 feet per hour, and the cuttings have been in the form of ropy, viscous, spiral strips, as much as 3 feet in length, which tend to ball up and are extremely difficult to remove from the wall. Consequently, it has been proposed to penetrate such plugs by partially remelting the asphalt.

We have found that by using a special type of asphalt, having the hereinafter defined characteristics, the formation can be positively sealed against "lost circulation" and effective drilling resumed with a minimum of expense and lost drilling time.

To attain the advantages of the present invention, it is essential that the bituminous material used be one which can be readily pumped into the well at moderate temperature, so as to avoid the necessity of excessively preheating the pump and lines to avoid plugging and excessive pumping costs; that the material be one which will rapidly solidify at the subterranean temperature in the well; and that, when solidified, it forms a readily drillable plug from which the cuttings are easily removed from the well by the circulation of conventional drilling mud.

Being somewhat soluble in hydrocarbons, the remaining asphalt wall-coating will be sufficiently dissolved by crude oil, which may be present in the formation, to permit the seeping of the oil into the well and thus supplement production from lower strata.

We have, with particular advantage, used for this purpose an asphalt prepared by the air blowing of a flux of vacuum reduced asphalt derived from Oregon Basin crude oil and having the following characteristics:

| | |
|---|---|
| Softening point, ° F | 205 |
| Penetration at 77° F. (100 gm., 5 sec.) ____dmm__ | 4 |
| Penetration at 32° F. (200 gm., 60 sec.) ____dmm__ | 1 |
| Penetration at 115° F. (50 gm., 5 sec.) ____dmm__ | 12 |
| Viscosity at 375° F. S. f. s | 252 |
| Ductility at 77° F. (5 cm. per min.) | 0 |
| Pounds per gallon | 8.76 |

Because of its relatively low softening point and viscosity, the asphalt just described may be readily pumped into the well at a moderate temperature of about 375° F. and penetrates the formation to an extent sufficient to positively seal the walls of the well against the escape of drilling fluid and against the flowing of water or gas from the formation into the well.

The asphalt plugs formed by this asphalt are readily drillable, using a conventional rotary rock bit, at the surprising rate of 200 ft. per hr., the cuttings being in the form of fine, discrete particles of asphalt which are readily carried out of the well by conventional circulating drilling mud.

Using the asphalt specifically described above, we have, for example, satisfactorily sealed a well, in which circulation of drilling fluid was lost at about 800 ft., by pumping into the well 150 barrels of the asphalt at a fluid temperature of about 375° F. and then permitted the asphalt to stand for 24 hours. Thereafter, drilling was resumed with circulation of drilling mud. The drilling proceeded at a surprising rate of about 200 ft. per hr. and the asphalt cuttings, in a fine powdered form, were carried from the well without difficulty by the drilling fluid. By this procedure loss of circulation of the drilling fluid was eliminated down to a depth of 1340 feet.

In the sealing operation just described, the asphalt was pumped into the well using a pump of the type ordinarily used for pumping cement slurry. The pump was first preheated by passing hot oil through the pump and externally heating the pump and connecting pipe lines. The hot asphalt was then pumped into the well through the drill stem, displacing the drilling mud remaining in the well. A wooden plug was placed in the upper end of the well about 36 feet below the surface, thus exerting considerable pressure on the asphalt and forcing a portion thereof into the formation crevices and pores.

Asphalt of the type described will usually set to a drillable hardness in approximately 8 hours, in the absence of excessive subterranean temperatures, which are rarely encountered at depths where lost circulation most frequently occurs.

Although the asphalt described above has been used with particular advantage, asphalts having somewhat different characteristics and other similar bituminous materials may be used. However, it is essential that the bituminous material be one having a penetration of not more than 10 dmm. at 77° F. (100 gm., 5 sec.) and that its viscosity at 375° F. be not greater than about 350 S. f. s. (Saybolt furol seconds).

Thus, the bituminous material used may be either a naturally occurring asphalt or an asphalt produced from petroleum, coal tar pitches, or the like, provided they have penetration and viscosity characteristics within the range just indicated.

These materials have the advantage of the desirable thermoplastic properties to positively seal the formation, quick setting, good drillability and fluidity at relatively low temperatures. Further, they are relatively inexpensive. They are especially adapted to the correction of lost circulation due to cavities, cavernous horizons or fissures, fracture zones, conglomerates and solution cavities in salt or other soluble formations.

It will be understood that references herein and in the appended claims to penetration is intended to mean values determined by a penetrometer of the Universal type and that viscosity characteristics are those determined by the conventional Saybolt Furol method. The methods used in determining the specific values herein given, or prescribed, for penetration, ductility, softening point and viscosity, respectively, are those known by the American Society for Testing Materials' designations D5–52, D113–44, D36–26 and D88–44.

We claim:

1. In the drilling of wells, a method of sealing the pores and fissures in the wall formation against loss of circulating drilling fluid comprising pumping into the well under pressure and at a fluid temperature, a stream of a normally solid bituminous material characterized by a penetration at 77° F. (100 gm., 5 sec.) of not in excess of 10 dmm. in conjunction with a viscosity at 375° F. of not in excess of 350 S. f. s., in an amount sufficient to fill a substantial depth of the well permitting the material to cool and solidify to form a solid plug and drilling through the plug while circulating a drilling fluid through the well.

2. In the drilling of wells, a method of sealing the pores and fissures in the wall formation against loss of circulating drilling fluid comprising pumping into the well under pressure and at a fluid temperature, a stream of an asphalt characterized by a penetration at 77° F. (100 gm., 5 sec.) of not in excess of 10 dmm. in conjunction with a viscosity at 375° F. of not in excess of 350 S. f. s., in an amount sufficient to fill a substantial depth of the well permitting the asphalt to cool and solidify to form a solid plug and drilling through the plug while circulating a drilling fluid through the well.

3. In the drilling of wells, a method of sealing the pores and fissures in the wall formation against loss of circulating drilling fluid comprising pumping into the well under pressure and at a fluid temperature, a stream of an asphalt having substantially the following characteristics:

| | |
|---|---|
| Softening point, °F | 205 |
| Penetration at 77° F. (100 gm., 5 sec.) dmm | 4 |
| Penetration at 32° F. (200 gm., 60 sec.) dmm | 1 |
| Penetration at 115° F. (50 gm., 5 sec.) dmm | 12 |
| Viscosity at 375° F. S. f. s | 252 |
| Ductility at 77° F. (5 cm. per min.) | 0 | in an amount sufficient to fill a substantial depth of the well, permitting the material to cool and solidify to form a solid plug and drilling through the plug while circulating a drilling fluid through the well.

References Cited in the file of this patent

UNITED STATES PATENTS

| | | |
|---|---|---|
| 978,359 | Cooper | Dec. 13, 1910 |
| 1,307,027 | Swan | June 17, 1919 |
| 2,223,789 | Limburg | Dec. 3, 1940 |
| 2,258,829 | Berge et al. | Oct. 14, 1941 |